United States Patent
Chaudhry et al.

(10) Patent No.: US 7,293,160 B2
(45) Date of Patent: Nov. 6, 2007

(54) MECHANISM FOR ELIMINATING THE RESTART PENALTY WHEN REISSUING DEFERRED INSTRUCTIONS

(75) Inventors: Shailender Chaudhry, San Francisco, CA (US); Paul Caprioli, Mountain View, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 187 days.

(21) Appl. No.: 11/058,521

(22) Filed: Feb. 14, 2005

(65) Prior Publication Data

US 2005/0278509 A1    Dec. 15, 2005

Related U.S. Application Data

(60) Provisional application No. 60/579,911, filed on Jun. 14, 2004.

(51) Int. Cl.
*G06F 9/30* (2006.01)
*G06F 9/40* (2006.01)

(52) U.S. Cl. ...................... 712/214; 712/228
(58) Field of Classification Search ................ 712/214
See application file for complete search history.

(56) References Cited

U.S. PATENT DOCUMENTS 5,333,281 A * 7/1994 Nishikawa et al. ......... 712/218

(Continued)

FOREIGN PATENT DOCUMENTS

EP    0 357 188 A2    3/1990

OTHER PUBLICATIONS

"A large, fast instruction window for tolerating cache misses" Alvin R. Lebeck, Jinson Koppanalil, Tong Li, Jaidev Patwardhan, Eric Rotenberg May 2002 Publisher: IEEE Computer Society, ACM Press.*

"Runahead execution: An effective alternative to large instruction windows" Mutlu, O.; Stark, J.; Wilkerson, C.; Patt, Y.N.; Micro, IEEE.*

(Continued)

*Primary Examiner*—Eddie Chan
*Assistant Examiner*—Idriss Alrobaye
(74) *Attorney, Agent, or Firm*—Park, Vaughan & Fleming LLP; Anthony Jones (57) ABSTRACT

One embodiment of the present invention provides a system which facilitates eliminating a restart penalty when reissuing deferred instructions in a processor that supports speculative-execution. During a normal execution mode, the system issues instructions for execution in program order, wherein issuing the instructions involves decoding the instructions. Upon encountering an unresolved data dependency during execution of an instruction, the processor performs a checkpointing operation and executes subsequent instructions in an execute-ahead mode, wherein instructions that cannot be executed because of the unresolved data dependency are deferred, and wherein other non-deferred instructions are executed in program order. When an unresolved data dependency is resolved during execute-ahead mode, the processor begins to execute the deferred instructions in a deferred mode. In doing so, the processor initially issues deferred instructions, which have already been decoded, from a deferred queue. Simultaneously, the processor feeds instructions from a deferred SRAM into the decode unit, and these instructions eventually pass into the deferred queue. In this way, at the start of deferred mode, deferred instructions can issue from the deferred queue without having to pass through the decode unit, thereby providing time for deferred instructions from the deferred SRAM to progress through a decode unit in order to read input values for the decoded instruction, but not to be re-decoded.

20 Claims, 3 Drawing Sheets

U.S. PATENT DOCUMENTS

| | | | | |
|---|---|---|---|---|
| 5,881,280 A | * | 3/1999 | Gupta et al. | 712/244 |
| 5,966,530 A | * | 10/1999 | Shen et al. | 712/244 |
| 6,279,101 B1 | * | 8/2001 | Witt et al. | 712/215 |
| 6,324,639 B1 | * | 11/2001 | Heishi et al. | 712/212 |
| 2005/0210223 A1 | * | 9/2005 | Caprioli et al. | 712/220 |

OTHER PUBLICATIONS

"Instruction Fetch Deferral using Static Slack", by Gregory A. Muthler et al., Proceedings of the 35th Annual IEEE/ACM International Symposium on Microarchitecture, 2002.

* cited by examiner

FIG. 4

MECHANISM FOR ELIMINATING THE RESTART PENALTY WHEN REISSUING DEFERRED INSTRUCTIONS

RELATED APPLICATION

This application hereby claims priority under 35 U.S.C. §119 to U.S. Provisional Patent Application No. 60/579,911 filed on 14 Jun. 2004, entitled "Mechanism for Eliminating the Restart Penalty when Issuing Deferred Instructions," by inventors Shailender Chaudhry, Paul Caprioli and Marc Tremblay.

BACKGROUND

1. Field of the Invention

The present invention relates to techniques for improving the performance of computer systems. More specifically, the present invention relates to a method and an apparatus for eliminating the restart penalty when reissuing deferred instructions.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two cache or main memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that are available for register renaming purposes during out-of-order execution also limits the effective size of the issue queue.

Some processor designers have proposed utilizing an execute-ahead mode to avoid cache-miss delays. During a normal-execution mode, the system issues instructions for execution in program order. Upon encountering an unresolved data dependency during execution of an instruction, the system generates a checkpoint that can subsequently be used to return execution of the program to the point of the instruction. Next, the system executes subsequent instructions in an execute-ahead mode, wherein instructions that cannot be executed because of an unresolved data dependency are deferred, and wherein other non-deferred instructions are executed in program order.

When the unresolved data dependency is resolved during execute-ahead mode, the system enters a deferred execution mode, wherein the system executes deferred instructions. If all deferred instructions are executed during this deferred execution mode, the system returns to normal-execution mode to resume normal program execution from the point where the execute-ahead mode left off.

By continuing to perform work while waiting for cache misses to return, the execute-ahead mode can significantly increase the amount of work that can be completed by a processor.

When the processor enters deferred mode from execute-ahead mode, there presently exists a restart penalty because deferred instructions must be introduced into the pipeline at a stage where they can read the Architectural Register File (ARF) to obtain source operands. Since the ARF is read during the decode stage of the in-order processor, the deferred instruction must enter the pipeline prior to the decode stage. Consequently, the execution of the first deferred instruction will be delayed by the number of cycles it takes to get the first deferred instruction through the decode stage.

Hence, what is needed is a method and an apparatus for avoiding the restart penalty when entering deferred mode from execute-ahead mode.

SUMMARY

One embodiment of the present invention provides a system which facilitates eliminating a restart penalty when reissuing deferred instructions in a processor that supports speculative-execution. During a normal execution mode, the system issues instructions for execution in program order, wherein issuing the instructions involves decoding the instructions. Upon encountering an unresolved data dependency during execution of an instruction, the processor performs a checkpointing operation and executes subsequent instructions in an execute-ahead mode, wherein instructions that cannot be executed because of the unresolved data dependency are deferred, and wherein other non-deferred instructions are executed in program order. When an unresolved data dependency is resolved during execute-ahead mode, the processor begins to execute the deferred instructions in a deferred mode. In doing so, the processor initially issues deferred instructions, which have already been decoded, from a deferred queue. Simultaneously, the processor feeds instructions from a deferred SRAM into the decode unit, and these instructions eventually pass into the deferred queue. In this way, at the start of deferred mode, deferred instructions can issue from the deferred queue without having to pass through the decode unit, thereby providing time for deferred instructions from the deferred SRAM to progress through a decode unit in order to read input values for the decoded instruction, but not to be re-decoded.

In a variation of this embodiment, executing deferred instructions in the deferred mode involves: issuing deferred instructions for execution in program order; deferring execution of deferred instructions that still cannot be executed because of unresolved data dependencies; and executing other deferred instructions that are able to be executed in program order.

In a variation of this embodiment, if some deferred instructions are deferred again, the processor returns to execute-ahead mode at the point where execute-ahead mode left off.

In a variation of this embodiment, entries in the deferred queue include source operands which were available from the architectural register file when the instruction was stored in the deferred queue.

In a variation of this embodiment, when data is returned which resolves a data dependency for a deferred instruction in the deferred queue, the data can be bypassed to the deferred queue.

In a variation of this embodiment, the deferred queue stores enough instructions to keep the execution unit from stalling while waiting for instructions to be fed from the deferred SRAM through the decode unit.

In a variation of this embodiment, decoded instructions are stored in the deferred queue in order of deferral In a variation of this embodiment, once the deferred queue has stored a maximum number of instructions, all subsequent deferred instructions are stored in the deferred SRAM in order of deferral.

In a variation of this embodiment, once the deferred SRAM has stored a maximum number of instructions, any further attempts to store instructions to the deferred SRAM cause the processor to enter a scout mode wherein instructions are speculatively executed to prefetch future loads, but wherein results are not committed to the architectural state of the processor.

In a variation of this embodiment, instructions in the deferred queue bypass operands through a working register file, which contains results of executed instructions which have not yet been stored to the processor's architectural state.

In a variation of this embodiment, the size of the working register file is at least equal to the number of stages in an execute unit plus the number of storage positions in the deferred queue.

In a variation of this embodiment, instructions in the deferred SRAM access their operands from the processor's architectural register file.

In a variation of this embodiment, if all deferred instructions are executed, the processor returns to the normal-execution mode to resume normal program execution from a point where the execute-ahead mode left off.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Sequence of Instructions

Figure 1:
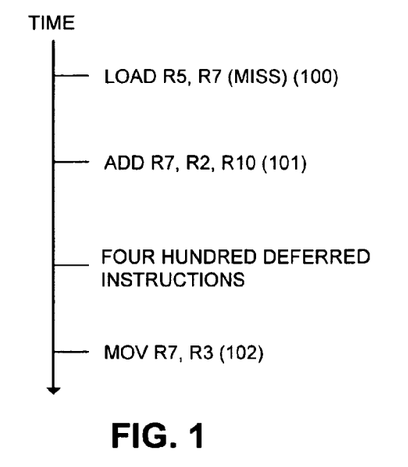
FIG. 1 illustrates a sequence of instructions in accordance with an embodiment of the present invention

FIG. 1 illustrates an exemplary sequence of instructions which demonstrates the interaction of deferred queue 410 (see FIG. 4) and deferred SRAM 409 with Architectural Register File (ARF) 412 and Working Register File (WRF) 413.

For the purposes of this example, deferred queue 410 and deferred SRAM 409 are initially assumed to be empty. Note that the progression of time is downward, so that instructions that are issued later appear lower in the figure.

As FIG. 1 shows, there is a series of instructions which start with a LOAD instruction 100 that is attempting to LOAD from an address in processor register R5 to processor register R7. This load results in a miss. Since LOAD instruction 100 misses (and is hence subject to an unresolved data dependency), LOAD instruction 100 is deferred into deferred queue 410 and the processor enters execute-ahead mode. During execute-ahead mode, the following ADD instruction 101, which has a data dependency with LOAD instruction 100, is also deferred to deferred queue 410.

(In an alternative implementation of the present invention, the unresolved LOAD instruction 100 is not deferred. Instead, the processor waits until it encounters an instruction which has a data dependency on the unresolved LOAD instruction 100, namely ADD instruction 101. At this point, the processor defers ADD instruction 101 and enters execute-ahead mode.)

Next, the processor issues a large number of instructions in execute-ahead mode. Some of these instructions do not have unresolved data dependencies and they can be executed, but four hundred of the subsequent instructions have unresolved data dependencies and must be deferred. The first few of the deferred instructions are stored deferred queue 410, while the rest of the deferred instructions are stored in deferred SRAM 409.

Instruction 102 is a MOV instruction which, like earlier ADD instruction 101, results in an unresolved data dependency because it accesses register R7. Since the slots in deferred queue 410 have already been filled, MOV instruction 102 is deferred into deferred SRAM 409.

When the LOAD returns data to register R7, the processor leaves the execute-ahead mode and begins to execute the deferred instructions in a deferred mode. The first instruction issued by deferred queue 410 is LOAD instruction 100. Since register R7 is the data that LOAD instruction 100 was waiting for, instruction 100 immediately executes, storing its results temporarily in a slot in WRF 413.

Next, ADD instruction 101 is issued from deferred queue 410. ADD instruction 101 immediately follows LOAD instruction 100 in deferred queue 410. The result of LOAD instruction 100 has therefore not been permanently committed to ARF and it is still only stored in WRF 413. The register R7 input for ADD instruction 101 is copied from WRF 413 and ADD instruction 101 executes.

Finally, after the four hundred intervening deferred instructions execute, MOV instruction 102 issues. Because four hundred and two instructions have issued between LOAD instruction 100 and MOV instruction 102, the results for LOAD instruction 100 have already been committed to the architectural state of the processor and do not exist in WRF 413. In order to get the data that was stored in register R7, MOV instruction 102 must read R7 in ARF 412. The ARF read occurs in decode stage 405 of the pipeline, so deferred SRAM 409 introduces MOV instruction 102 into decode stage 405. MOV instruction 102 passes through decode stage 405, retrieving its operands from ARF 412, and is placed in execution stage 408 using the pathway through deferred queue 410. MOV instruction 102 then executes and retires.

State Diagram

Figure 2:
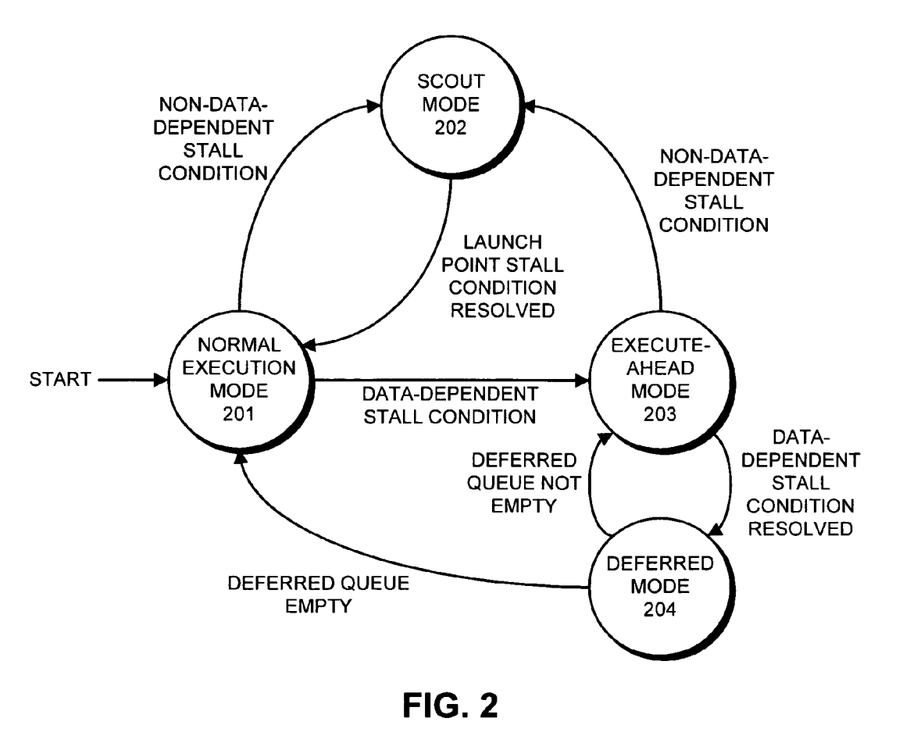
FIG. 2 presents a state diagram in accordance with an embodiment of the present invention.

FIG. 2 presents a state diagram which includes the execute-ahead mode in accordance with an embodiment of the present invention. The system starts in normal-execution mode 201, wherein instructions are executed in program order as they are issued from instruction buffer 403 (see FIG. 4).

Next, if an unresolved data dependency arises during execution of an instruction, the system moves to execute-ahead mode 203. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 203, the system performs a checkpointing operation to generate a checkpoint that can be used, if necessary, to return execution of the process to the point where the unresolved data dependency was encountered; this point is referred to as the "launch point." (Note that generating the checkpoint can involve saving the precise architectural state of the processor to facilitate subsequent recovery from exceptions that arise during execute-ahead mode or deferred mode.) The system also "defers" execution of the instruction that encountered the unresolved data dependency, and stores the deferred instruction in deferred queue 410 or deferred SRAM 409. The deferred instructions are written to deferred queue 410 until it is full and then they are written to deferred SRAM 409.

Within execute-ahead mode 203, the system continues to execute instructions in program order as they are received from instruction buffer 403, and any instructions that cannot execute because of an unresolved data dependency are stored in deferred queue 410 or deferred SRAM 409 in the order listed above.

When the system is in execute-ahead mode 203, if an unresolved data dependency is finally resolved, the system moves into deferred-execution mode 204, wherein instructions are executed in program order, first from deferred queue 410 and then from deferred SRAM 409. During deferred-execution mode 204, the system attempts to execute deferred instructions from deferred queue 410 and then deferred SRAM 409. Note that the system attempts to execute these instructions in program order with respect to other deferred instructions, but not with respect to other previously executed non-deferred instructions (and not with respect to deferred instructions executed in previous passes through deferred queue 410 or deferred SRAM 409). During this process, the system defers execution of deferred instructions that still cannot be executed because of unresolved data dependencies and places these again-deferred instruction back into deferred SRAM 409. The system executes the other instruction that can be executed in program order with respect to each other.

After the system completes a pass through deferred queue 410 and then deferred SRAM 409, if deferred queue 410 and deferred SRAM 409 are both empty, the system moves back into normal-execution mode 201. This may involve committing changes made during execute-ahead mode 203 and deferred-execution mode 204 to the architectural state of the processor, if such changes have not been already committed. It can also involve throwing away the checkpoint generated when the system moved into execute-ahead mode 203.

On the other hand, if either deferred queue 410 or deferred SRAM 409 is not empty after the system completes a pass through deferred queue 410 and deferred SRAM 409, the system returns to execute ahead mode to execute instructions from instruction buffer 403 from the point where the execute-ahead mode 203 left off.

If a non-data dependent stall condition arises while the system is in normal-execution mode 201 or in execute-ahead mode 203, the system moves into scout mode 202. (This non-data-dependent stall condition can include: a memory barrier operation; a load buffer full condition; a store buffer full condition, or a deferred buffer full condition.) In scout mode 202, instructions are speculatively executed to prefetch future loads, but results are not committed to the architectural state of the processor.

Scout mode is described in more detail in U.S. Pat. No. 6,415,356, entitled "Method and Apparatus for Using an Assist Processor to Pre-Fetch Data Values for a Primary Processor," by inventors Shailender Chaudhry and Marc Tremblay. It is also described in U.S. Provisional Application No. 60/436,539, entitled, "Generating Prefetches by Speculatively Executing Code Through Hardware Scout Threading," by inventors Shailender Chaudhry and Marc Tremblay (filed 24 Dec. 2002). It is additionally described in U.S. Provisional Application No. 60/436,492, entitled, "Performing Hardware Scout Threading in a System that Supports Simultaneous Multithreading," by inventors Shailender Chaudhry and Marc Tremblay (filed 24 Dec. 2002). The above listed references are hereby incorporated by reference herein to provide details on how scout mode operates.

Unfortunately, computational operations performed during scout-ahead mode need to be recomputed again, which can require a large amount of computational work.

When the original "launch point" stall condition is finally resolved, the system moves back into normal-execution mode 201, and, in doing so, uses the previously generated checkpoint to resume execution from the launch point instruction (the instruction that initially encountered the stall condition).

Note that the launch point stall condition is the stall condition that originally caused the system to move out of normal-execution mode 201. For example, the launch point stall condition can be the data-dependent stall condition that caused the system to move from normal-execution mode 201 to execute-ahead mode 203, before moving to scout mode 202. Alternatively, the launch point stall condition can be the non-data-dependent stall condition that caused the system to move directly from normal-execution mode 201 to scout mode 202.

The Process of Deferring Instructions

Figure 3:
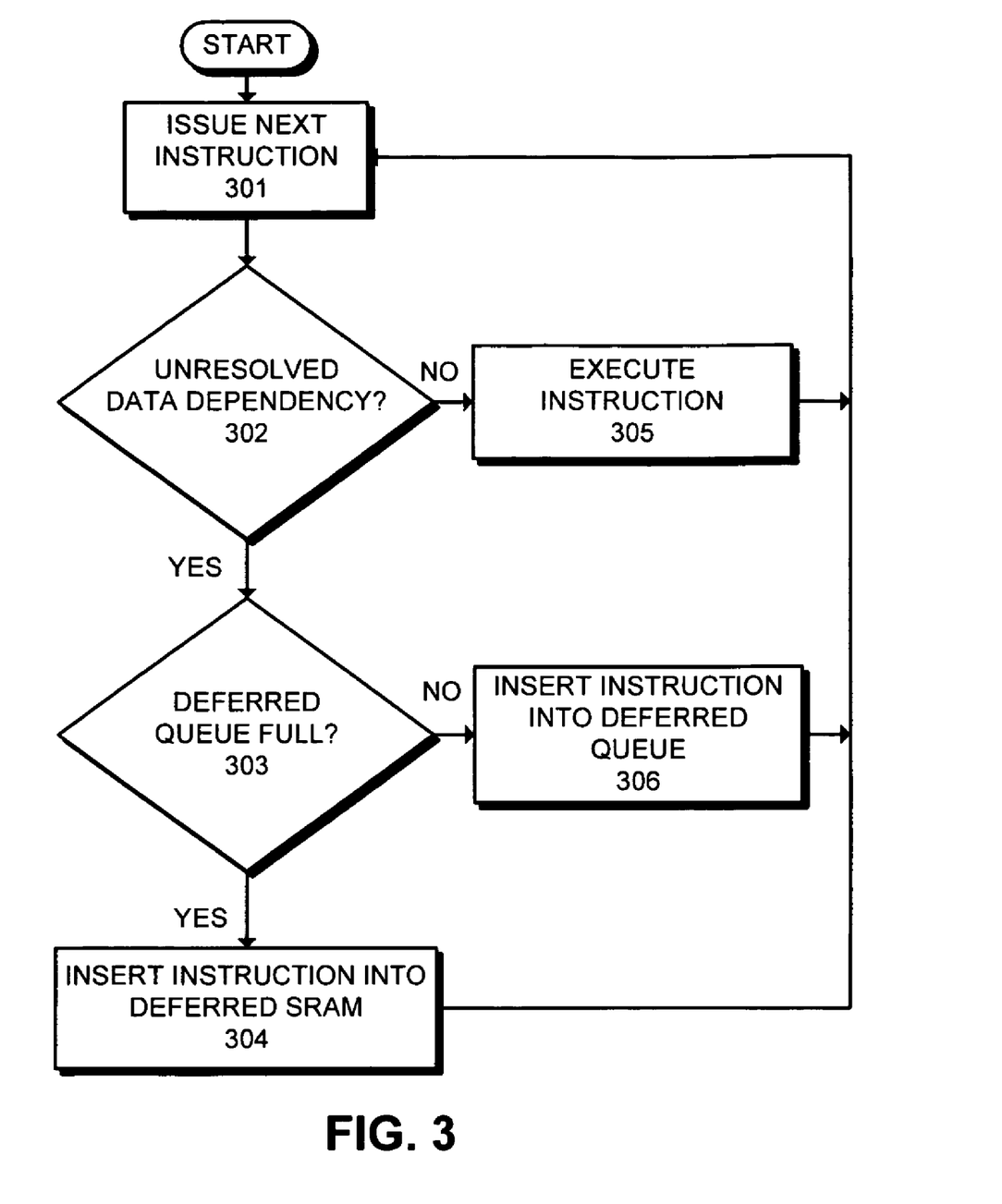
FIG. 3 presents a flow chart for instruction deferral in accordance with an embodiment of the present invention.

FIG. 3. presents a flow chart for instruction deferral in accordance with an embodiment of the present invention.

The processor starts by issuing instructions in program order (step 301). Unless the processor encounters an instruction with an unresolved data dependency (step 302), the processor executes each instruction (step 305) and continues to issue instructions in program order (step 301).

On the other hand, if there is an unresolved data dependency (step 302), the processor defers the instruction. The preferred storage location for the deferred instruction is the deferred queue (step 306), but the deferred queue is small and only holds a limited number of deferred instructions. Beyond the first few deferred instructions (step 303), the processor stores deferred instructions in the deferred SRAM (step 304).

Ultimately, the processor returns to issuing instructions in program order (step 301).

Pipeline

Figure 4:
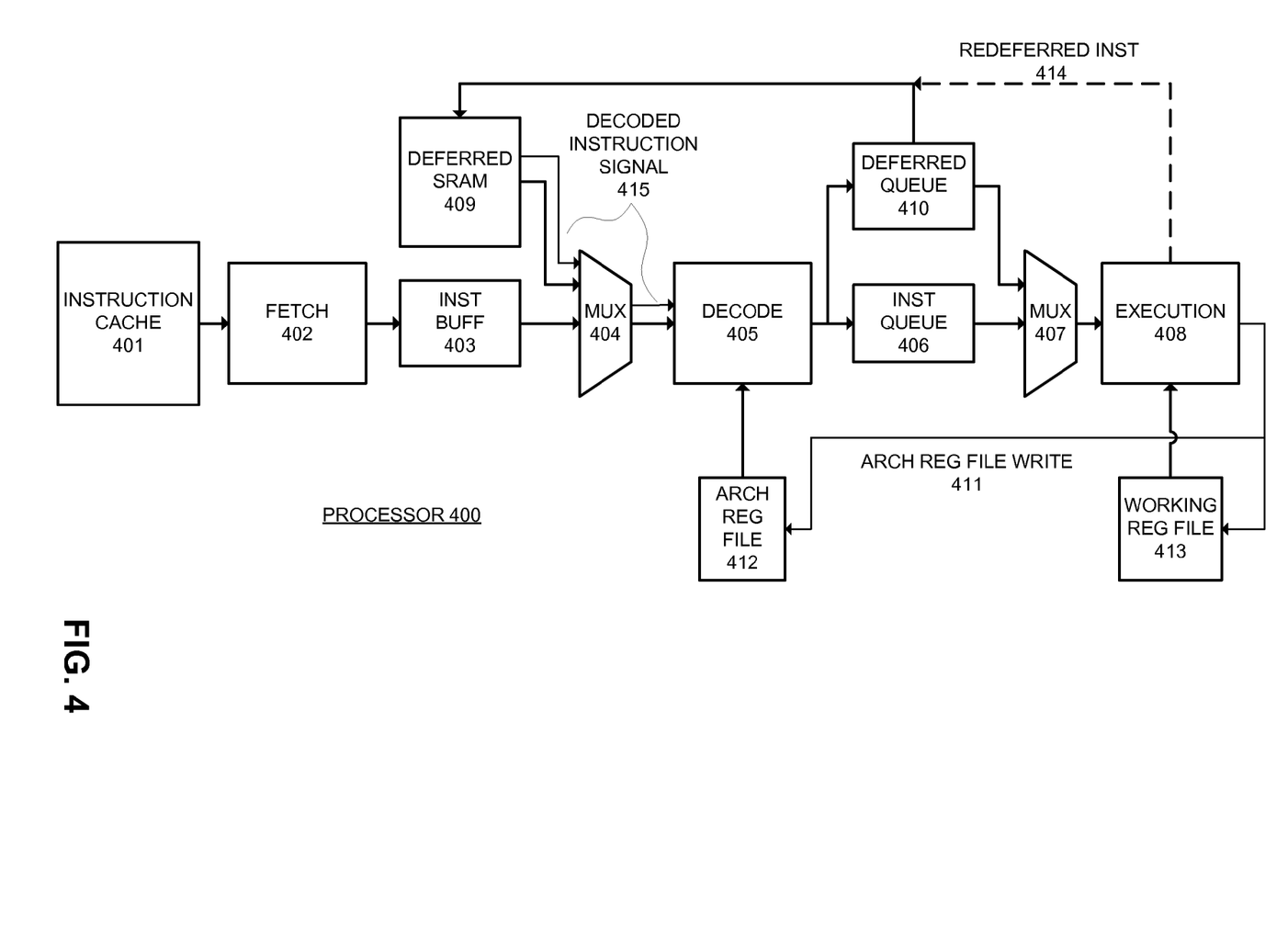
FIG. 4 illustrates design of a processor in accordance with an embodiment of the present invention.

FIG. 4 illustrates the design of a processor 400 in accordance with an embodiment of the present invention. Processor 400 can generally include any type of processor, including, but not limited to, a microprocessor, a mainframe computer, a digital signal processor, a personal organizer, a device controller and a computational engine within an appliance. As is illustrated in FIG. 4, processor 400 includes common processor structures such as instruction cache 401, fetch unit 402, instruction buffer 403, decode stage 405, instruction queue 406, and execution stage 408.

Processor 400 also contains two local memory structures, ARF 412 and WRF 413, which hold the values used while executing instructions within the processor.

The purpose of ARF 412 is to hold the results of executed instructions which are committed into the architectural state of the processor. ARF 412 is read during decode stage 405 and written to 411 when an instruction successfully retires at the end of the execution stage 408. Note that ARF 412 is read during decode stage 405 because the read takes several clock cycles. Reading ARF 412 any later would cause unnecessary delay in processing instructions.

WRF 413 holds intermediate results before they have been committed to ARF 412. WRF 413 is read during execution stage 408 and is designed to bypass a limited number of execution results back to execution stage 408 for consumption by subsequent instructions. Access to WRF 413 is fast. However, WRF 413 only holds enough results to cover the number of steps in execution stage 408 plus the number of storage locations in deferred queue 410. Note that all instructions that do not receive their source operands from WRF 413 must read ARF 412.

Unique to processor 400 are deferred SRAM 409 and deferred queue 410, which are memory structures dedicated to buffering deferred instructions. Note that like instruction buffer 403, deferred SRAM 409 and deferred queue 410 are organized as FIFO buffers.

Multiplexers 404 and 407 control the inputs to decode stage 405 and execution stage 408, respectively. Multiplexers 404 and 407 select the source of the inputs to the stages that they feed based on whether the processor is running in normal-execution mode or deferred mode. Multiplexer 404 also passes decoded instruction signal 415, which indicates whether the issued instruction is decoded or not, from deferred SRAM 409 to decode stage 405. If the instruction is already decoded, decode stage 405 does not perform the decoding step on the instruction, but does perform the ARF lookup for the source operands.

During normal-execution mode, fetch unit 402 retrieves instructions to be executed from instruction cache 401, and feeds these instructions into instruction buffer 403. Instruction buffer 403 forwards the instructions to be executed through multiplexer 404 and into decode stage 405. From decode stage 405, the instructions pass to instruction queue 406, which is organized as a FIFO buffer Instruction queue 406 feeds instructions in program order through multiplexer 407 and into execution stage 408.

If an instruction cannot be executed due to an unresolved data dependency, such as an operand that has not returned from a load operation, processor 400 defers the execution of the instruction and moves the instruction into deferred queue 410 or deferred SRAM 409. Processor 400 then executes instructions in an execute-ahead mode wherein instructions with unresolved data dependencies are deferred while instructions without data dependencies are executed in program order.

When the data dependency is eventually resolved, instructions from deferred queue 410 and deferred SRAM 409 are executed in deferred mode. During deferred mode, the instructions are executed in program order with respect to other deferred instructions, but not with respect to other previously executed non-deferred instructions.

When processor 400 enters deferred mode, deferred instructions are issued from deferred queue 410 directly into execution stage 408. In parallel, deferred instructions are issued from deferred SRAM 409 into decode stage 405. The instructions are issued from deferred SRAM 409 through decode stage 405 because the instructions in deferred SRAM 409 must read their inputs from ARF 412. The limited number of instructions issued from deferred queue 410 keep execution stage 408 busy while the instructions introduced from deferred SRAM 409 propagate through decode stage 405.

While processor 400 is in deferred mode, all deferred instructions fed to execution stage 408 are routed to execution stage 408 by multiplexer 407 from deferred queue 410. The instructions issued by deferred SRAM 409 must therefore propagate through decode stage 405 and pass through deferred queue 410 and multiplexer 407 in route to execution stage 408.

During the execution of deferred instructions in the deferred mode, instructions which still cannot execute because of an unresolved data dependency are re-deferred. When an instruction is re-deferred, it is placed at the tail of deferred SRAM 409. Note that processor 400 only makes one pass through deferred queue 410 and deferred SRAM 409 and then attempts to reenter normal-execution mode. If any instructions have been re-deferred, processor 400 instead reenters execute-ahead mode where it left off.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for eliminating a restart penalty when reissuing deferred instructions in a processor that supports speculative-execution, comprising:
   issuing instructions for execution in program order during execution of a program in a normal-execution mode, wherein issuing the instructions involves decoding the instructions;

upon encountering an unresolved data dependency during execution of an instruction, performing a checkpointing operation and executing subsequent instructions in an execute-ahead mode;

during execute-ahead mode instructions are decoded and issued in program order, wherein decoded instructions that cannot be executed because of the unresolved data dependency are deferred, and wherein other non-deferred decoded instructions are executed in program order; and when the unresolved data dependency is resolved during execute-ahead mode, executing deferred decoded instructions in a deferred mode by initially issuing deferred decoded instructions from a deferred queue, feeding decoded instructions from a deferred SRAM through a decode unit and into the deferred queue, whereby, upon entering deferred mode, the decoded instructions in the deferred queue are issued to an execution unit without needing to be decoded, thereby providing time for deferred decoded instructions from the deferred SRAM to progress through a decode unit in order to read input values for the decoded instruction, but not to be re-decoded.

2. The method of claim 1, wherein executing deferred decoded instructions in the deferred mode involves:

issuing deferred decoded instructions for execution in program order;

deferring execution of deferred decoded instructions that still cannot be executed because of unresolved data dependencies; and executing other deferred decoded instructions that are able to be executed in program order.

3. The method of claim 2, wherein if some deferred decoded instructions are deferred again, the method further comprises returning to execute-ahead mode at the point where execute-ahead mode left off.

4. The method of claim 1, wherein entries in the deferred queue include source operands which were available from the architectural register file when the decoded instruction was stored in the deferred queue.

5. The method of claim 1, wherein when data is returned which resolves a data dependency for a deferred decoded instruction in the deferred queue, the data is bypassed to the deferred queue.

6. The method of claim 1, wherein the deferred queue stores enough decoded instructions to keep an execution unit from stalling while waiting for decoded instructions to be fed from the deferred SRAM through the decode unit.

7. The method of claim 1, wherein, during execute-ahead mode, decoded instructions are stored in the deferred queue in order of deferral.

8. The method of claim 7, wherein once the deferred queue has stored a maximum number of decoded instructions, all subsequent deferred decoded instructions are stored in the deferred SRAM in order of deferral.

9. An apparatus for eliminating a restart penalty when reissuing deferred instructions in a processor that supports speculative-execution, comprising:

an execution mechanism configured to issue instructions for execution in program order during execution of a program in a normal-execution mode, wherein the execution mechanism is configured to decode the instructions before issuing the instructions;

upon encountering an unresolved data dependency during execution of an instruction, the execution mechanism is configured to perform a checkpointing operation and execute subsequent instructions in an execute-ahead mode, during execute-ahead mode instructions are decoded and issued in program order, wherein decoded instructions that cannot be executed because of the unresolved data dependency are deferred, and wherein other non-deferred decoded instructions are executed in program order; and when the unresolved data dependency is resolved during execute-ahead mode, the execution mechanism is configured to execute deferred decoded instructions in a deferred mode, by initially issuing deferred decoded instructions from a deferred queue, feeding decoded instructions from a deferred SRAM through a decode unit and into the deferred queue, whereby, upon entering deferred mode, the decoded instructions in the deferred queue are issued to an execution unit without needing to be decoded, thereby providing time for deferred decoded instructions from the deferred SRAM to progress through a decode unit in order to read input values for the decoded instruction, but not to be re-decoded.

10. The apparatus of claim 9, wherein the execution mechanism is configured to execute deferred decoded instructions in the deferred mode by:

issuing deferred decoded instructions for execution in program order;

deferring execution of deferred decoded instructions that still cannot be executed because of unresolved data dependencies; and executing other deferred decoded instructions that are able to be executed in program order.

11. The apparatus of claim 10, wherein if some deferred decoded instructions are deferred again, the execution mechanism is further configured to return to execute-ahead mode at the point where execute-ahead mode left off.

12. The apparatus of claim 9, wherein entries in the deferred queue include source operands which were available from the architectural register file when the decoded instruction was stored in the deferred queue.

13. The apparatus of claim 9, wherein when data is returned which resolves a data dependency for a deferred decoded instruction in the deferred queue, the execution mechanism is configured to bypass the data to the deferred queue.

14. The apparatus of claim 9, wherein the deferred queue stores enough decoded instructions to keep an execution unit from stalling while waiting for decoded instructions to be fed from the deferred SRAM through the decode unit.

15. The apparatus of claim 9, wherein the execution mechanism is configured such that, during execute-ahead mode, decoded instructions are stored in the deferred queue in order of deferral.

16. The apparatus of claim 15, wherein once the deferred queue has stored a maximum number of decoded instructions, the execution mechanism is configured such that all subsequent deferred decoded instructions are stored in the deferred SRAM in order of deferral.

17. The apparatus of claim 16, wherein once the deferred SRAM has stored a maximum number of decoded instructions, the execution mechanism is configured such that any further attempts to store decoded instructions to the deferred SRAM cause the processor to enter a scout mode wherein instructions are speculatively executed to prefetch future loads, but wherein results are not committed to the architectural state of the processor.

18. The apparatus of claim 9, wherein the execution mechanism is configured such that decoded instructions in the deferred queue bypass operands through a working register file, which contains results of executed instructions which have not yet been stored to the processor's architectural state.

19. The apparatus of claim 18, wherein the size of the working register file is at least equal to the number of stages in an execute unit plus the number of storage positions in the deferred queue.

20. The apparatus of claim 9, wherein the execution mechanism is configured such that the decoded instructions in the deferred SRAM access their operands from the processor's architectural register file.

* * * * *